(12) United States Patent
Hacker et al.

(10) Patent No.: US 7,238,285 B2
(45) Date of Patent: *Jul. 3, 2007

(54) LIQUID FILTER ASSEMBLY FOR USE WITH TREATMENT AGENT; AND, METHODS

(75) Inventors: John R. Hacker, Edina, MN (US); Brian Mandt, Shakopee, MN (US); Brent A. Gulsvig, Fairbault, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/072,094

(22) Filed: Mar. 4, 2005

(65) Prior Publication Data

US 2005/0194301 A1 Sep. 8, 2005

Related U.S. Application Data

(60) Provisional application No. 60/621,421, filed on Oct. 22, 2004, provisional application No. 60/550,505, filed on Mar. 5, 2004.

(51) Int. Cl.
*B01D 27/00* (2006.01)
*B01D 27/08* (2006.01)
*F01M 1/00* (2006.01)
*C10M 125/10* (2006.01)

(52) U.S. Cl. .................. 210/232; 210/206; 210/209
(58) Field of Classification Search ............ 210/232, 210/206, 209
See application file for complete search history.

(56) References Cited

U.S. PATENT DOCUMENTS

| | | |
|---|---|---|
| 2,093,877 A | 9/1937 | Pentz |
| 2,270,969 A | 1/1942 | Robinson |
| 2,306,325 A | 12/1942 | Allam |
| 2,955,028 A | 10/1960 | Bevans |
| 3,224,592 A | 12/1965 | Burns et al. |
| 3,598,738 A | 8/1971 | Biswell et al. |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,144,166 A | 3/1979 | DeJovine |

(Continued)

FOREIGN PATENT DOCUMENTS

| | | |
|---|---|---|
| DE | 35 29 755 A1 | 2/1987 |
| DE | 203 10 064 U1 | 11/2003 |
| EP | 1 233 173 A2 | 8/2002 |
| WO | WO 02/092193 A1 | 11/2002 |
| WO | WO 02/096534 A1 | 12/2002 |

(Continued)

*Primary Examiner*—Thomas M. Lithgow
(74) *Attorney, Agent, or Firm*—Merchant & Gould P.C.

(57) ABSTRACT

A liquid filter arrangement including an internally received treatment agent storage and release cartridge is provided. The assembly is configured for diffusion of the treatment agent from the treatment agent storage and release cartridge, into liquid flowing through the filter arrangement. A particular arrangement shown is configured which provides for a dynamic type of liquid flow providing a current directed through the treatment agent storage and release cartridge. In the preferred arrangements, an initial static type of flow followed by later dynamic flow, is provided. Alternatives, methods of assembly and descriptions of use are provided.

19 Claims, 8 Drawing Sheets

U.S. PATENT DOCUMENTS

| | | |
|---|---|---|
| 4,144,169 A | 3/1979 | Grueschow |
| 4,324,213 A | 4/1982 | Kasting et al. |
| 4,402,912 A | 9/1983 | Krueger et al. |
| 4,738,776 A | 4/1988 | Brown |
| 4,755,289 A | 7/1988 | Villani |
| 4,782,891 A | 11/1988 | Cheadle et al. |
| 4,979,969 A | 12/1990 | Herding |
| 5,024,268 A | 6/1991 | Cheadle et al. |
| 5,050,549 A | 9/1991 | Sturmon |
| 5,064,799 A | 11/1991 | Monte et al. |
| 5,069,799 A | 12/1991 | Brownawell et al. |
| 5,094,745 A | 3/1992 | Reynolds |
| 5,225,081 A | 7/1993 | Brownawell |
| 5,258,118 A | 11/1993 | Gouritin et al. |
| 5,342,511 A | 8/1994 | Brown et al. |
| 5,382,355 A | 1/1995 | Arlozynski |
| 5,435,346 A | 7/1995 | Tregidgo et al. |
| 5,459,074 A | 10/1995 | Muoni |
| 5,498,332 A | 3/1996 | Handtmann |
| 5,541,330 A | 7/1996 | Wear et al. |
| 5,556,542 A | 9/1996 | Berman et al. |
| 5,591,330 A | 1/1997 | Lefebvre |
| 5,643,541 A | 7/1997 | Peddicord et al. |
| 5,662,799 A | 9/1997 | Hudgens et al. |
| 5,718,258 A | 2/1998 | Lefebvre et al. |
| 5,738,785 A | 4/1998 | Brown et al. |
| 5,753,116 A | 5/1998 | Baumann et al. |
| 5,772,873 A | 6/1998 | Hudgens et al. |
| 5,803,024 A | 9/1998 | Brown |
| 5,948,248 A | 9/1999 | Brown |
| 6,045,692 A | 4/2000 | Bilski et al. |
| 6,098,575 A | 8/2000 | Mulshine et al. |
| 6,165,519 A | 12/2000 | Lehrer et al. |
| 6,196,019 B1 | 3/2001 | Higo et al. |
| 6,235,194 B1 | 5/2001 | Jousset |
| 6,238,554 B1 | 5/2001 | Martin, Jr. et al. |
| 6,264,833 B1 | 7/2001 | Reamsnyder et al. |
| RE37,369 E | 9/2001 | Hudgens et al. |
| 6,379,564 B1 | 4/2002 | Rohrbach et al. |
| 6,475,379 B2 | 11/2002 | Jousset et al. |
| 6,478,958 B1 | 11/2002 | Beard et al. |
| 6,537,453 B2 | 3/2003 | Beard et al. |
| 6,596,165 B2 | 7/2003 | Koivula |
| 6,623,636 B2 | 9/2003 | Rohrbach et al. |
| 6,787,033 B2 | 9/2004 | Beard et al. |
| 6,827,750 B2 | 12/2004 | Drozd et al. |
| 6,835,304 B2 | 12/2004 | Jousset et al. |
| 6,843,916 B2 | 1/2005 | Burrington et al. |
| 6,860,241 B2 | 3/2005 | Martin et al. |
| 6,919,023 B2 | 7/2005 | Merritt et al. |
| 6,969,461 B2 | 11/2005 | Beard et al. |
| 7,153,422 B2 | 12/2006 | Herman et al. |
| 7,156,991 B2 | 1/2007 | Herman et al. |
| 2002/0043495 A1 | 4/2002 | Beard et al. |
| 2002/0060178 A1 | 5/2002 | Tsabari |
| 2002/0170280 A1 | 11/2002 | Soh |
| 2002/0185454 A1 | 12/2002 | Beard et al. |
| 2002/0195380 A1 | 12/2002 | Martin et al. |
| 2002/0195384 A1 | 12/2002 | Rohrbach et al. |
| 2003/0121860 A1 | 7/2003 | Harenbrock et al. |
| 2003/0218150 A1 | 11/2003 | Blakemore et al. |
| 2003/0226790 A1 | 12/2003 | Brown et al. |
| 2003/0226793 A1 | 12/2003 | Merritt et al. |
| 2004/0140254 A1 | 7/2004 | Merritt et al. |
| 2004/0140255 A1 | 7/2004 | Merritt et al. |
| 2005/0167350 A1 | 8/2005 | Herman et al. |
| 2005/0173325 A1 | 8/2005 | Klein et al. |
| 2005/0194301 A1* | 9/2005 | Hacker et al. ............... 210/232 |
| 2005/0194312 A1 | 9/2005 | Niemeyer et al. |
| 2006/0113233 A1 | 6/2006 | Merritt et al. |
| 2006/0180537 A1 | 8/2006 | Loftis et al. |

FOREIGN PATENT DOCUMENTS

| | | |
|---|---|---|
| WO | WO 03/018163 A1 | 3/2003 |
| WO | WO 03/018726 A1 | 3/2003 |
| WO | WO 03/019065 A1 | 3/2003 |
| WO | WO 03/064828 A1 | 8/2003 |
| WO | WO 2004/054684 A1 | 7/2004 |

* cited by examiner

LIQUID FILTER ASSEMBLY FOR USE WITH TREATMENT AGENT; AND, METHODS

CROSS-REFERENCE TO RELATED APPLICATIONS

The present application includes, with edits, the disclosure of U.S. Provisional Application 60/550,505 filed Mar. 5, 2004 and U.S. Provisional Application 60/621,421, filed Oct. 22, 2004, and a claim of priority to these filings is made, to the extent appropriate. The complete disclosure of U.S. Provisional Applications 60/550,505 and U.S. Provisional Application 60/621,421 are incorporated herein by reference, to the extent that is consistent with the present disclosure.

FIELD OF THE INVENTION

The present disclosure relates to liquid filters. It particularly concerns liquid filters which include, within a filter assembly, a construction for controlled release of a treatment agent for the liquid being filtered. A particular use for the assemblies described, would be as re-additization filters for lubrication oil, although principles described can be used in association with treatments of other liquids such as fuel, coolant liquids and hydraulic fluids.

BACKGROUND OF THE INVENTION

In many engine systems a liquid system is provided which needs to be both filtered and treated with an additive or treatment agent. An example is a lubrication oil system for diesel engines. In some instances, the lubrication oil for diesel engines contains an additive package to extend the life of the oil and to improve engine component protection. The additive package is made up of a variety of chemical compounds designed to perform specific functions in the oil. An example of one of the chemical compounds is zinc dithiophosphate (ZDP), which acts as an oxidation inhibitor in the oil. When the oil is heated in the presence of air (for example in a diesel engine) oxidation occurs, increasing the concentration of organic acids. The ZDP acts to inhibit oxidation, thereby decreasing the rate at which the acid is formed. A measure of the effectiveness of the ZDP in the oil is the "total base number" (TBN). The TBN is an indicator of the amount of acid in the oil. As ZDP becomes used up during engine operation, the TBN changes. At a certain defined TBN level, the oil is generally considered to be too acidic to be left in the engine, and thus needs to be replaced with "fresh" oil.

Diesel engine designs are undergoing changes, as a result of increasing emphasis on reduction of emissions from diesel engines, for example as mandated in the United States by the EPA. In some instances the changes cause acid formation in the oil to be more of an issue with respect to service interval, as compared to diesel engines of the past.

The initial additive package depletes in time. What has been needed has been improvements in approaches that allow for re-addition of the ZDP or similar treatment agents to a liquid (such as oil) under controlled conditions, during normal engine operation.

SUMMARY OF THE INVENTION

Filter assemblies are shown, which include a liquid filter cartridge and a treatment agent storage and release system. In two of the preferred arrangements shown, the treatment agent storage and release system is a separate cartridge from the filter cartridge; both being included in the same housing. In another embodiment shown, the filter cartridge and the storage and release cartridge are joined together as a single service component.

The preferred arrangements shown are for intended, controlled, treatment release. Various techniques and principles are disclosed that can be used separately, or together as shown in the preferred embodiments.

The techniques described herein can be implemented in either spin-on filters or serviceable bowl/cartridge arrangements. The techniques can be applied: (a) in a variety of liquid filters, including, for example, in lubrication filters, hydraulic fluid filters, coolant filters and fuel filters; and, (b) in a variety of specific configurations.

Methods of assembly and use are also provided.

BRIEF DESCRIPTION OF THE DRAWINGS

FIG. 5 being taken along line 5—5, FIG. 6.

DETAILED DESCRIPTION

Figure 1:
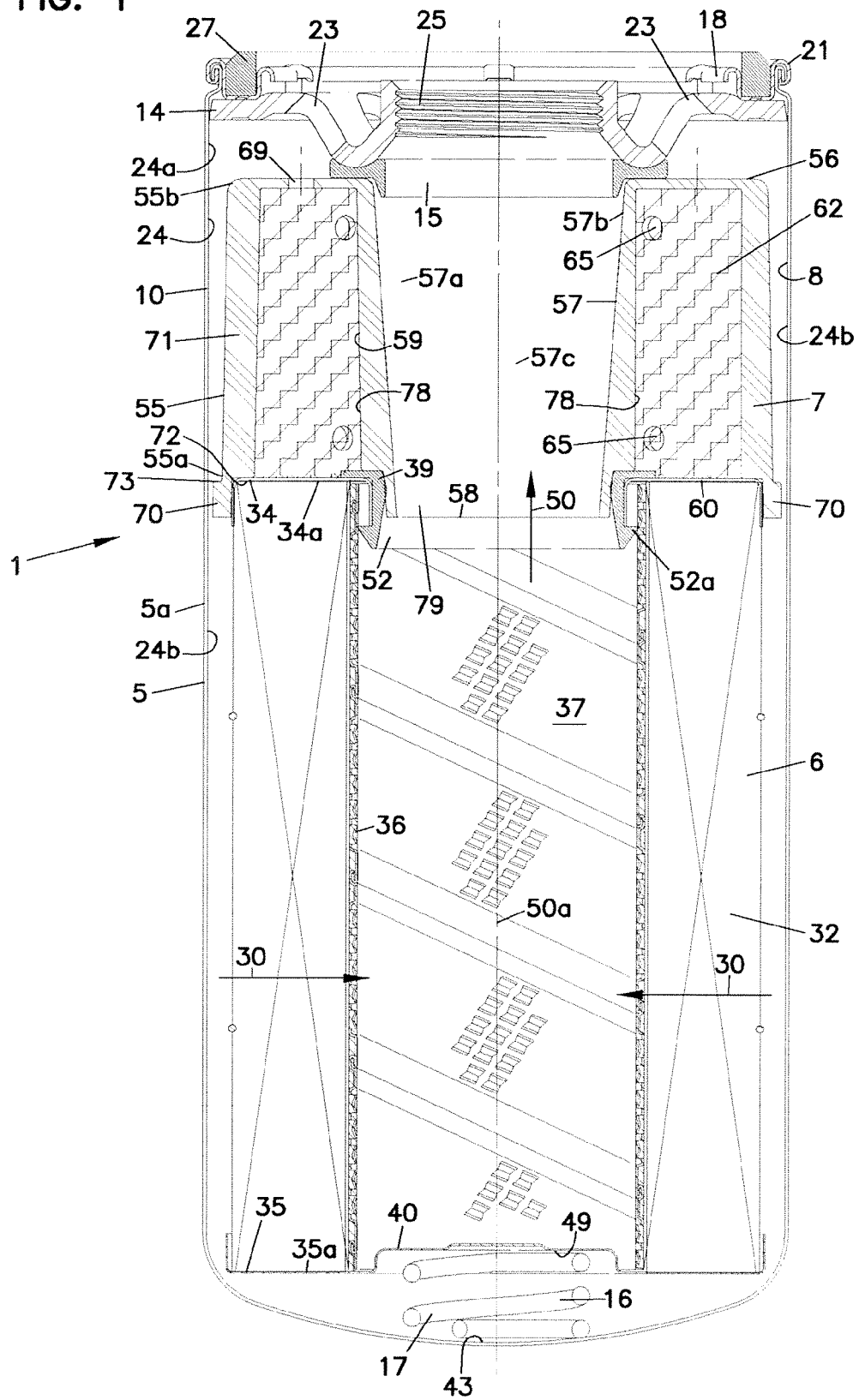
FIG. 1 is a schematic cross-sectional view of a first embodiment of a filter assembly incorporating principles for liquid treatment, according to the present disclosure; the cross-section being taken generally along line 1—1, FIG. 2.
Figure 2:
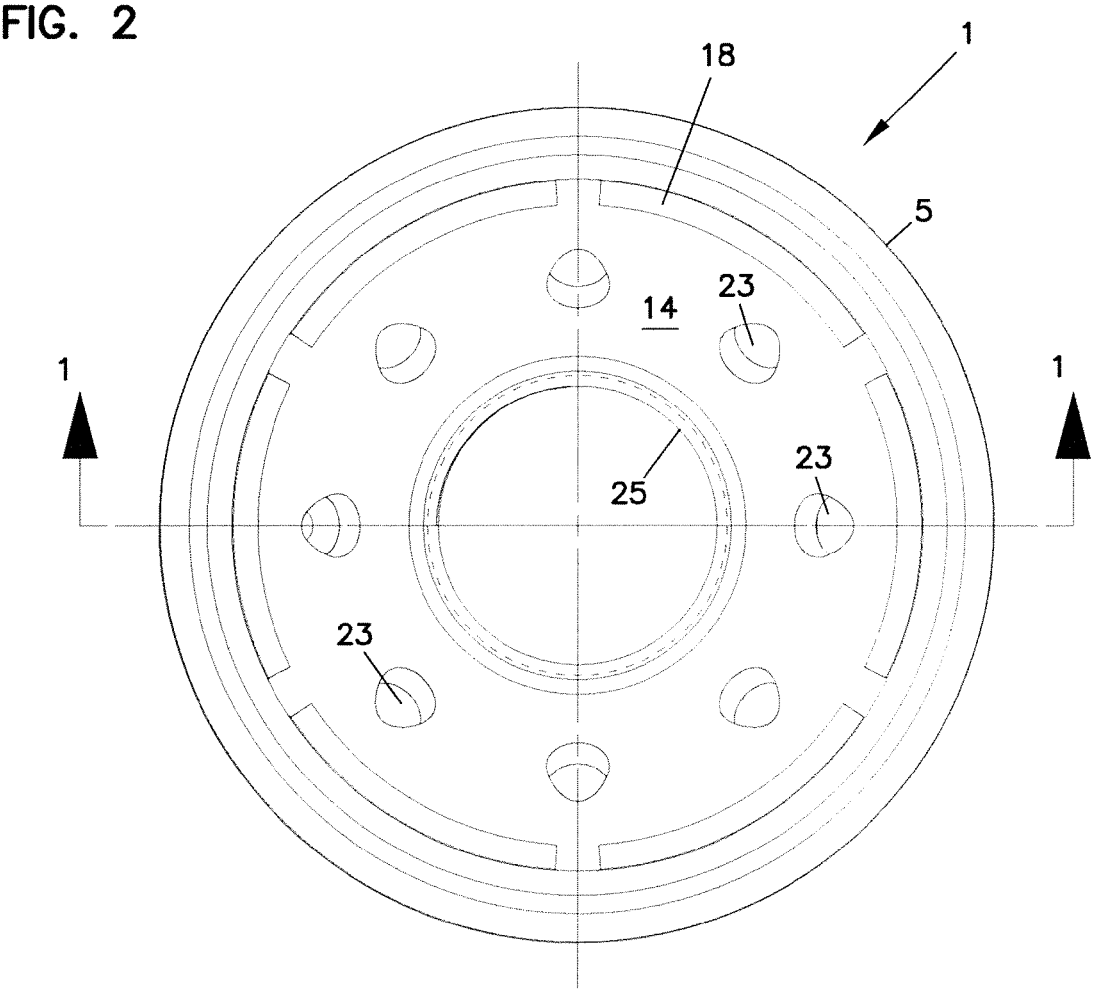
FIG. 2 is a top plan view of the assembly of FIG. 1.

I. Treatment Agents Used in Liquid Systems—Generally

The technology presented herein generally concerns liquid systems, such as lubricating oil systems, hydraulic fluid systems, cooling fluid systems or fuel filter systems. The technology more specifically concerns delivery of treatment agents or additives to such systems. Herein the terms "treatment agent," "additives" and variants thereof, are meant to refer to one or more agents released into the fluid or liquid filter stream, with time. An example of a treatment agent would be ZDP as characterized above for a lubricating oil system.

In particular, the techniques described herein involve delivery of treatment agents into liquid passing through a housing of a liquid filter assembly. In general, a liquid filter assembly is an assembly through which liquid flows, with filtering by passage through filter media, in use. The treatment agent is preferably delivered into the liquid, from a source within the filter assembly, during application of principles described herein. That is, in the preferred arrangements characterized herein, an assembly component which includes the treatment agent for delivery is contained within the filter assembly; for example within the housing of a spin-on filter assembly or within the housing or bowl of a bowl/cartridge filter assembly. Such arrangements, characterized in the various embodiments below, will be referred to as filter arrangements which include an "internal" treatment agent storage and release arrangement, container, cartridge or assembly. Preferred arrangements according to the present disclosure are ones configured to provide for treatment agent delivery into unfiltered liquid; i.e., the treatment agent is delivered into a liquid flow stream before the liquid flow stream is filtered by passage through filter media.

Herein the term "immobilized treatment agent" and variants thereof, is meant to refer to the treatment agent in a form in which it is contained in a treatment agent storage and release assembly container or arrangement, before diffusion into the liquid for treatment. In general "immobilized treatment agent" may be in the form of a solid or a gel.

Herein the term "erosion surface" when used to refer to "immobilized treatment agent," in an internal storage and release cartridge (assembly or arrangement) is meant to refer to any surface of the immobilized treatment agent which is directly contacted by at least a portion of liquid passing through the filter assembly in use, and thus at which diffusion of the treatment agent into the liquid occurs. That is, an "erosion surface" in this context, is a surface of the immobilized treatment agent which is contacted by liquid, at any given time, during use of the filter assembly.

The term "mobilized treatment agent" and variants thereof, is meant to refer to the treatment agent once diffused into the liquid to be treated. The term is meant to be applicable regardless of the form of diffusion, for example whether it involves dissolution of the treatment agent, or suspension of the treatment agent. That is, the specific mechanism of diffusion is not meant to be indicated by the term "mobilized" in this context.

The current disclosure specifically concerns filter arrangements for liquids which include a delivery system for immobilized treatment agent. This disclosure does not specifically concern the treatment agents themselves. The delivery vehicles described herein are particularly developed for use with gel forms of treatment agents, although alternate forms of treatment agents can be used. Gel forms of certain treatment agents have been developed, for example, by Lubrizol Corp. of Wickliffe, Ohio 44092-2201.

Several different embodiments of liquid filter assemblies including delivery systems for treatment agents are disclosed. In general, each is an assembly preferably developed to conveniently provide for a controlled rate of treatment agent release into liquid. In preferred arrangements a controlled variability in rate of treatment agent release into liquid, with time, is provided. In general, the term "variability in rate of treatment agent release into liquid, with time" is meant to refer to the fact that the preferred arrangements allow for an initial release of treatment agent at a first rate (or rate range), and a later release of treatment agent at a different rate (or rate range). The term "controlled" in this context, is meant to refer to the fact that it is the specific design of the delivery system, which provides for this variability.

The effect of a controlled variability and rate of treatment agent release in the liquid, with time, is, in part, provided by a preferred configuration for the delivery system that allows for different mechanisms of treatment agent release into the liquid, with time. These are generally referred to herein as a "static" mechanism or process; and, a "dynamic" mechanism or process. These terms are used not to refer to the dissolution mechanism of the agent into the liquid, but rather to refer to the nature of liquid flow and liquid contact with respect to the treatment agent.

Specifically, the preferred assemblies described herein are configured to operate a portion of the time with a "static" type of diffusion or flow. During this type of operation, treatment agent is contained within a sub-assembly in such a fashion that there is initially no actual flow of liquid through the sub-assembly during this period of "static" flow operation. Rather, diffusion of the treatment agent through a wall of the sub-assembly and into surrounding liquid is conducted, during this portion of operation. The term "static" is used to refer to the flow or diffusion under this operation, in which there is no actual continuous current of liquid through the sub-assembly, during this portion of operation. In general, during "static" flow operation, the subassembly which includes the treatment agent has liquid flow which enters and exits through the same aperture(s). That is, there is no internal flow channel provided, which allows the liquid to enter one aperture or set of apertures, and then to exit through a second aperture or second set of apertures.

After an initial period of static-type diffusion, in preferred configurations according to the present disclosure, there is a second operation implemented that is referred to herein as a "dynamic" flow operation. In this type of operation, treatment agent, contained within the sub-assembly, is contacted by a portion of liquid flow directed through the sub-assembly in use, to pick up treatment agent by diffusion into the liquid flow. More specifically, during this type of operation some liquid flow is directed through the sub-assembly by passage into a liquid flow inlet arrangement, and then eventual passage outwardly through a separate liquid flow outlet arrangement. This type of operation is referenced herein as "dynamic" because there is an actual liquid current flow generated through the sub-assembly.

In both the "dynamic" and "static" flow operations, the treatment agent diffuses into the liquid. However, in the dynamic flow operation, treatment agent release can be designed to occur at a relatively fast rate, by comparison to diffusion during an earlier static flow operation, if desired. This will be apparent from the descriptions of the various example assemblies below.

It is noted that a number of techniques are described herein, to provide for treatment agent release from a subassembly within a filter arrangement. The techniques can be applied, to advantage, to arrangements that are not configured for both a period of static flow operation and a period of dynamic flow operation. Thus, the principles described herein can be applied in arrangements that are only configured for dynamic flow operation or are only configured for static flow operation. However the more advantageous applications are as described, in arrangements which provide for a period of operation of each type.

As will be apparent from the following descriptions, the techniques described herein provide a convenient, simple to apply, approach to extending service life of a liquid, such as oil, in a vehicle or other equipment, simply by replacing the old filter with an arrangement as described.

II. Liquid Filter Assemblies Including Treatment Agent Storage and Release Subassemblies Configured for at least a First or Initial Release of Treatment Agent Through a Static Flow Process, and a Second Treatment Agent Release through a Dynamic Flow Process

A. The Arrangement of FIGS. 1–6.

1. Structure.

Referring first to the embodiment of FIG. 1, a liquid filter assembly 1 according to the present disclosure is presented. The liquid filter assembly 1 generally includes the following components: an outer housing or can 5, a filter cartridge 6, and a treatment agent storage and release cartridge 7. The particular assembly 1 depicted in FIG. 1, is one which contains an "internal" treatment agent storage and release cartridge 7, since the cartridge 7 is contained within an interior 8 of the housing or can 5.

For the filter assembly 1 depicted in FIG. 1, the housing 5, filter cartridge 6 and treatment agent storage and release cartridge 7 are generally configured or assembled appropriately for a "spin-on" style filter assembly 10. By the term "spin-on style filter assembly" and variants thereof in this context, it is meant that the components are assembled in a overall system which, in use, is spun onto a liquid circulation system of equipment (through threaded engagement), to later be spun off the filter head and be completely replaced, during servicing. This is by contrast to a bowl/cartridge style assembly, for which, periodically, the housing is opened and from which the filter cartridge and/or treatment agent cartridge are removable and replaceable (i.e., are serviceable), while the outer housing or bowl is retained for repeated use. The techniques described with respect to each embodiment can be applied in either a bowl/cartridge-type assembly, or in a spin-on assembly, as desired.

To accommodate construction as a spin-on style assembly 10, filter assembly 1 further includes top plate 14, inner gasket 15 and biasing arrangement 16. For the particular embodiment shown, the biasing arrangement 16, as is typical for many spin-on filter assemblies 10, is a coiled spring 17.

For the assembly 10, the top plate 14 is secured within the assembly 1 under a portion of housing 5, in this case under cover piece 18 secured at roll seam 21. The top plate 14 includes entry apertures 23 for flow of liquid to be filtered into annular interior volume 24 of housing 5, eventually to a location between side wall 5a and around the cartridges 6, 7. The top plate 14 also includes threaded exit aperture 25. By the threaded exit aperture 25, the assembly 1 can be mounted onto equipment, for use. Aperture 25 is also an exit aperture for liquid which has been filtered and treated by the assembly 1. Gasket 27 is positioned on cover piece 18 to allow for a liquid tight seal against equipment and around aperture 25, during use.

In general, assembly 1 is configured for out-to-in filter flow through the filter cartridge 6. By this it is meant that liquid flow extends through filter cartridge 6 in the directions indicated generally by arrows 30, i.e., out-to-in, in normal operation. The particular filter cartridge 6 depicted comprises a filter media construction 32, in this instance cylindrical, extending between first and second ends or end caps 34 and 35 and defining an open center 36, in this instance surrounding porous center support or liner 37. The liner 37 can be made from a variety of materials, for example a perforated tube or a spiral wound support having a louvered construction. Conventional materials can be used.

The assembly could alternatively be configured for a reverse in-to-out flow operation of filtering through the filter cartridge 6, if desired.

The specific materials of the filter cartridge 6 are a matter of design choice and conventional materials can be used. Typically for liquid filters, the filter media 32 will comprise a media of cellulose, a synthetic or a composite of the two. The selection of media is a matter of design choice, for a desired efficiency, flow restriction and lifetime. A variety of materials are useable. Donaldson Company, Inc., the owner of this disclosure, markets products using its proprietary media technology under the mark Synteq™, and such media technology can be used for applications described herein. An example of a useable one has an efficiency range of average $Beta_{10}=2.0$ and $Beta_{22}=75$.

Although alternatives are possible, the media is typically pleated and arranged in a star-shaped (in cross-section) cylindrical form and is either secured in molded end caps, or is secured by potting to metal end caps. For the particular arrangement depicted in FIG. 1, the end caps 34, 35 are metal end caps, 34a, 35a. End cap 34 is generally open, i.e., it has an open central aperture 39, to allow clean fluid to escape from the interior 36 of the media 32. End cap 35, on the other hand, is an entirely closed end cap 40, i.e., it has no aperture therein so the liquid cannot by-pass the media 32 and avoid being filtered. It is noted that in some instances it may be desirable to provide a by-pass valve arrangement in end cap 35, to allow for selected by-pass flow should the media 32 become undesirably occluded. An end cap having a by-pass valve arrangement therein and mounted on the end cap, such as end cap 35, will typically still be referred to herein as a "closed" end cap, since in normal (non-bypass) use the valve would be closed.

In alternate arrangements, end cap 35 could be configured to be open, with appropriate seal arrangements preventing unfiltered liquid flow into central area 36, if desired.

In still further alternate arrangements, a bypass filter can be provided within assembly 1.

In general, undesirable leakage of liquid flow from annular region 24 (around and not through element 6) directly into central space 36, and then through aperture 39, is prevented, in part, by gasket 15, which, in the instance shown, is compressed between the treatment agent storage and release cartridge 7 and a portion of top plate 14. Biasing pressure to ensure a seal at gasket 15 is provided by the biasing arrangement 16, which, under compression, presses between bottom 43 (of housing 5), and structure 49 which translates into axial pressure against gasket 15, in the direction of axial arrow 50.

Avoidance of undesirable leakage of unfiltered liquid between the internal treatment agent storage and release cartridge 7, and the filter cartridge 6, is provided by gasket 52. Gasket 52, discussed in further detail below, is compressed between the two cartridges 6, 7, as a result of a seal force in the direction of arrow 50, again applied by biasing arrangement 16.

Attention is now directed to the internal treatment agent storage and release cartridge 7. For the particular embodiment shown, the cartridge 7 has a ring or donut shape with an outer side wall 55, an end wall 56 and an inner side wall 57.

In general, the outer side wall 55, end wall 56 and inner side wall 57 define an interior treatment agent receiving volume 59. For the preferred arrangement, the outer side wall 55 is generally cylindrical, with a slight conical shape having a wider bottom end 55a and a narrower top end 55b, although alternatives are possible. The inner wall 57 has a generally funnel shape, defining outside surface 57a, with a wide end 57b adjacent end wall 56 and a narrow opposite end 58, although alternatives are possible.

In the specific embodiment shown, outside surface 57a to inner wall 57, defines a flow channel 57c around which cartridge 7 is positioned, as a ring. Although alternatives are possible, the flow channel 57c is co-axial with a central axis 50a of interior 36 of filter cartridge 6, and is in flow communication with exit flow of filtered liquid from the cartridge 6 outwardly through end cap 34. Filtered liquid from cartridge 6 passes through channel 57c as it exits aperture 25 and assembly 1.

As will be apparent from an evaluation of FIG. 1, the cartridge 7 can be formed from a single, integral, piece of material, either as a molded configuration or from a bent, stamped, or spun piece of metal. The particular cartridge 7 depicted, has a molded construction. For example it may be molded from a glass filled polymer, such as glass filled (for example 33% glass filled) Nylon (for example Nylon 6/6).

The particular cartridge 7 includes an open end 60 at an end opposite end wall 56. With respect to the open end 60, the cartridge 7 may be characterized as "inverted." In this context the term "inverted" is meant to refer to the fact that the open end 60 of the treatment agent containment and release cartridge 7 is directed toward filter 6 and away from top cover 14. Alternatives are possible.

The particular cartridge 7 comprises a subassembly. That is: (a) it can be manufactured independently of other components within assembly 1; and, (b) it can be inserted, into housing 5, during assembly, as a pre-manufactured component. The cartridge 7 depicted, FIG. 1, is shown having treatment agent 62 therein.

In general, treatment agent storage and release cartridges, such as cartridge 7, characterized herein include an aperture arrangement through which liquid can pass, to encounter contained, immobilized, treatment agent. Such an "aperture arrangement" or "open portion" will be referred to herein as a "diffusion opening." The total open area of the diffusion opening(s) will be referred to herein as the "total diffusion area." In general, one or more diffusion openings can be provided in a variety of ways, including, for example, by aperture arrangement 65 in the outer side wall 55 of the cartridge 7. For the particular treatment agent storage and release cartridge 7 depicted, there are no diffusion apertures or openings in the inner side wall 57 (i.e., on the filtered liquid side of gaskets 15, 52). Thus, for the assembly 1 shown, treatment agent can only diffuse into unfiltered liquid.

The particular size, number and location of diffusion openings in outer side wall 55 is a matter of choice, depending upon diffusion affects desired. The issue is discussed in greater detail below, in association with some comments about certain preferred, specific, arrangements.

Figure 4:
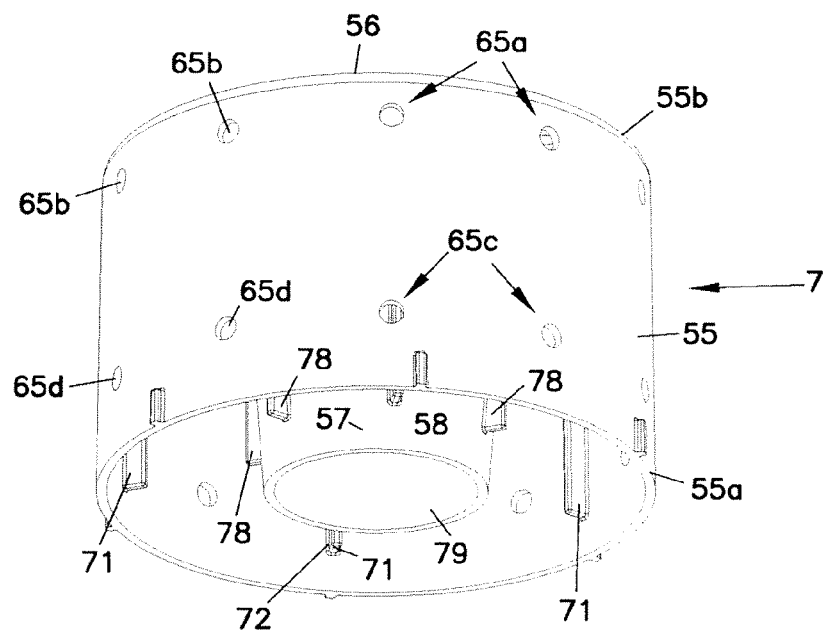
FIG. 4 is a bottom perspective view of the same component as FIG. 3.
Figure 5:
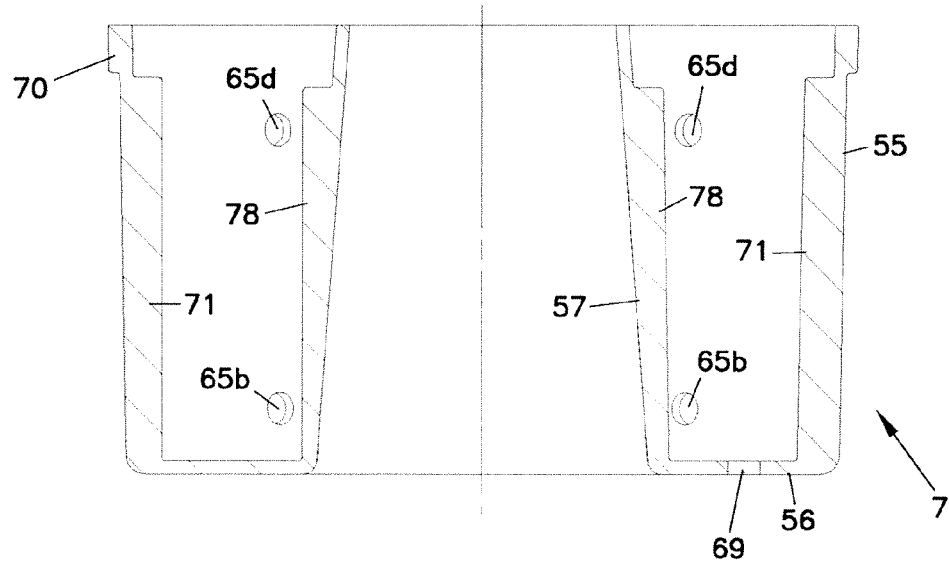
FIG. 5 is a cross-sectional view of the component depicted in FIGS. 3 and 4 and shown inverted relative to these figures.
Figure 6:
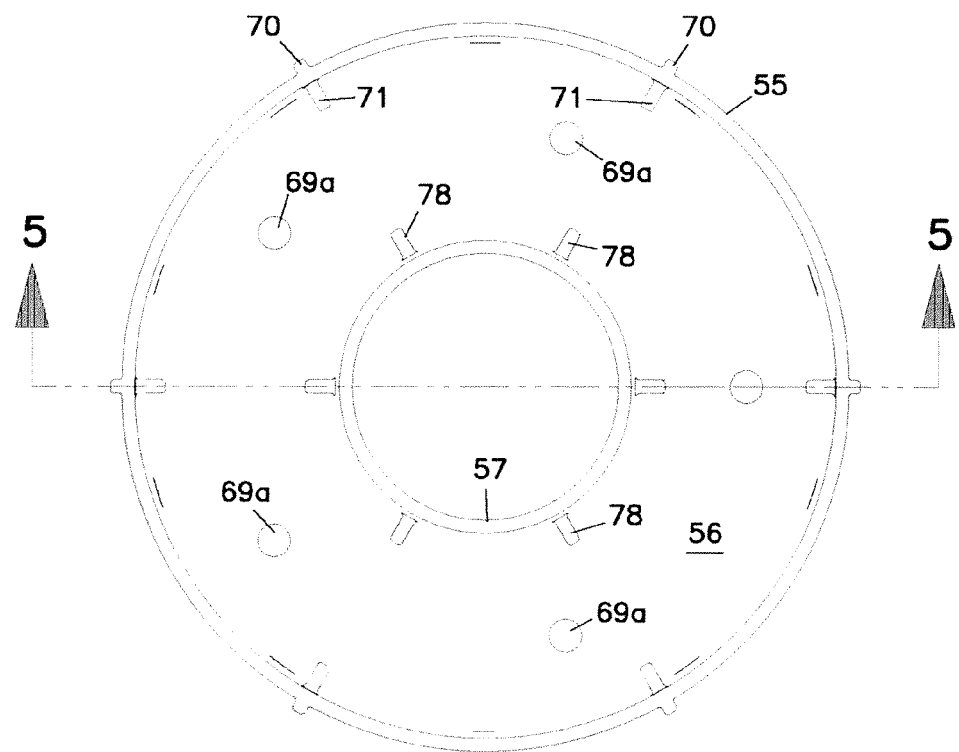
FIG. 6 is a bottom plan view of the component depicted in FIGS. 3–5.

Still referring to FIG. 1, it is noted that the treatment agent storage and release cartridge 7 further includes aperture arrangement 69 in end wall 56. Examples of size and individual aperture arrangements of this aperture arrangement 69, for the embodiment shown, are indicated in FIGS. 4 and 6; and are discussed below.

It is anticipated that the cartridge 7 can be used with a gel-type treatment agent that has enough solidity to stay in the cartridge 7, when the cartridge 7 is inverted. For treatment agents with less resistance to flow, a cover, screen or other arrangement could be put across end 60. Alternatively, cartridge 7 could be kept with open end 60 up, until closed by end cap 34. A gel could be set in the cartridge 7, prior to assembly of the assembly 1.

If the consistency of solidity of the treatment agent 62 is perceived to be an issue with respect to undesired or premature flow through aperture arrangements 69 or 65, a screen or other arrangement across these apertures can be used; or, in the case of a gel, a temporary closure can be used as the gel forms. With a gel form of additive 62, in general no significant issue of undesirable flow after gel formation is presented.

It is noted with respect to the embodiment FIG. 1, that the cartridge 7 and the end cap 34 could be made secured to one another. However this will generally not be preferred when an assembly specifically (in detail) like FIG. 1 is made. A preferred form of engagement, as shown, is provided by having spaced, annular, projections 70, on wall 55 of cartridge 7, and using internal ribs 71 to form a receiving shoulder 72, at an end 73 of outer side wall 55 adjacent element 6, with the shoulder 72 sized to receive an outer region of end cap 34. The projections 70, help keep the cartridge 7 centered. Thus, for the assembly shown, cartridge 7 is positioned adjacent end 34 of media construction 6.

Inner side wall 57 is configured with inwardly projecting ridges 78 and a portion 79 directed into aperture 39 in end cap 34. The ridges 78 are configured to form a shoulder to engage gasket 52 and to compress same, against end cap 34, to provide a seal therebetween. Gasket 52 includes a lower annular projection 52a, positioned to wrap over or around an end of end cap 34, to secure attachment is shown.

Typical manufacture would involve separate pre-manufacture of the filter cartridge 6 and the treatment agent cartridge 7 (with treatment agent positioned therein). These two components would then be placed into the outer housing 5, in appropriate order, as part of manufacture of the assembly 1. Typical assembly could be to: (1) place the spring 17 in position; (2) place the filter cartridge 6 in position with gasket 52; (3) place the treatment agent storage and release cartridge 7 in the housing 5, with gasket 15 in place; (4) place the top plate 14 in position, compressing the internal assembly against the spring 17 while placing cover 18 in positioned using roll seal 21; and, (5) place the gasket 27 in position. Alternatively, the filter cartridge 6 and treatment agent storage and release cartridge 7 could be brought into appropriate engagement with one another, with gasket 52 therebetween, and then the other assembly steps undertaken. In another approach, the internal parts could be stacked inverted, and the housing 5 positioned over the inverted stack. In some instances the gaskets can be placed on components, before those components are positioned in the housing 5. Of course, the particular number and order of steps is not critical, as long as a functional assembly results.

2. Operation.

Referring to FIG. 1, surfaces portions of the treatment agent 62, in overlap with aperture arrangements 65, 69, are initial erosion surfaces for treatment agent to diffuse into flow of liquid to be filtered, in annular region 24. Specifically, when liquid flow first enters region 24a by passage through apertures 23, and begins to flow over surfaces of, and around, treatment agent storage and release cartridge 7 and filter cartridge 6, the liquid will flow past aperture arrangements 69, 65. This flow will tend to erode the treatment agent immediately inside these aperture arrangements 69, 65 through diffusion of the agent into the liquid. This will be a static-type of diffusion, since the liquid flow, initially, will not be into and through the treatment agent storage and release cartridge 7, but rather will simply be across the outer face of cartridge 7; with some liquid passing into the aperture arrangements 65, 69 enough to encounter the treatment agent 62 but not with an actual current flow passing through the cartridge 7.

In time, as a result of the erosion of the treatment agent 62, flow paths will be opened in interior 59 of treatment agent storage and release cartridge 7 between and among various apertures in the aperture arrangements 65, 69. In general, when this occurs a positive current of liquid flow through the treatment agent storage and release cartridge 7 can occur. To facilitate such a positive current flow through the storage and release cartridge 7, the following is desirable: a total diffusion area for aperture arrangement 69 which is less than the total diffusion area of exposed apertures in aperture arrangement 65 (in side wall 55) which are in internal flow contact with aperture arrangement 69 as a result of the erosion. The term "internal flow contact" in this context, refers to flow between apertures via one or more flow channels formed and located within interior 59 of cartridge 7.

In general, liquid flow across an aperture creates a vacuum draw from inside of that aperture. Also, in general, the more rapid the liquid flow across an aperture, the greater the vacuum draw.

Referring to FIG. 1, in region 24a, internally of aperture 23 and above wall 56, an open volume for liquid flow is provided. Eventually that same liquid flows into region 24b, around cartridge 7 between cartridge 7, cartridge 6 and side wall 5a. In general, the same volume of liquid, per unit time, passes through regions 24a and 24b, over portions of cartridge 7. However because in the region of 24a a larger cross-sectional volume is provided than in region 24b, flow in region 24a is slower (in terms of flow contact across wall 56), then flow in region 24b (in terms of flow contact across wall 55). Thus, suction draw caused by liquid flow across an aperture in side wall 55 is greater than suction draw by flow across apertures in end wall 56.

Figure 3:
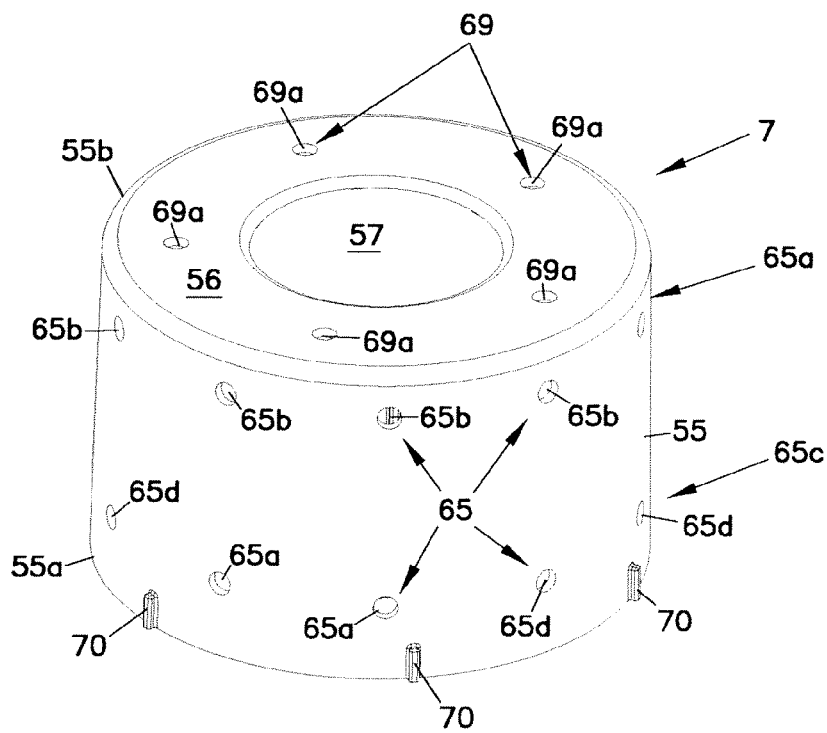
FIG. 3 is a top perspective view of a component useable in the assembly of FIG. 1.

Referring to FIG. 3, an internal flow path between aperture arrangement 69 and apertures of aperture arrangement 65, in particular apertures 65b of aperture arrangement 65a will be generated as a result of erosion. When this occurs, liquid flow from individual apertures 69a of aperture arrangement 69 into cartridge 7 and then outwardly through individual apertures 65b of aperture arrangement 65a will be generated. Because: (a) preferably the total diffusion area of aperture arrangement 65a is greater than the total diffusion area of aperture arrangement 69; and (b) the annular liquid flow across aperture arrangement 65a is preferably faster than across aperture arrangement 69, this internal flow direction will generally be into aperture arrangement 69 and out of aperture arrangement 65, in particular out of aperture arrangement 65a.

This internal dynamic flow at least initially results in greater diffusion rate of treatment agent within the cartridge 7, into the liquid flow, then the initial "static" erosion. Further erosion will occur, until aperture arrangement 65c, having individual apertures 65d, has also been exposed to a flow path from aperture arrangement 69. This will allow dynamic flow of liquid into apertures 69a and out of apertures 65d. Indeed, when the slight conical shape is used for side wall 55 as described herein, flow across aperture arrangement 65c will be even faster than flow across aperture arrangement 65a, since the outer annulus 24b will be smaller in cross-section, in this region, FIG. 1.

It is noted that the diffusion rate will be somewhat variable, as erosion occurs and the amount and shape of the treatment agent 62 changes. However, in general terms (for typical arrangements), diffusion will accelerate when the arrangement becomes configured (as a result of erosion) for dynamic fluid flow through the cartridge 7, as opposed to simply a static diffusion from internally of the cartridge 7 to externally.

In FIGS. 3 and 4, the treatment agent storage and release cartridge 7 is depicted. For convenience the cartridge 7 is shown without treatment agent therein. Referring to FIG. 3, for the particular example shown, five spaced apertures 69a in aperture arrangement 69 are used, although alternatives are possible. Typically 3–7 (preferably evenly) spaced apertures 69a will be used.

In addition, for the example shown, eight to ten, typically 6–14, (preferably evenly) spaced apertures 65b, and eight to ten (typically 6–14) spaced (preferably evenly spaced) apertures 65d are used in aperture arrangements 65a and 65c, although alternatives are possible. For the example shown, the size of apertures 65b, 65d and 69a are all about the same, although alternatives are possible. The configuration used ensures that there is generally at least 1.5 times, and typically at least about twice, the total diffusion area for each of arrangements 65a, 65c than arrangement 69. This helps ensure the desirable level of, and direction of, dynamic current flow.

The number of, and size of, apertures can be selected for any particular system, depending upon the amount of treatment agent release that is desirable. It is noted that apertures 65b and 65d can be merged into one another, as single large apertures, with a variety of alternate shapes to accomplish the desired results.

In general, it is desirable that the rate of treatment agent release into a system such as a lubricating oil system, is relatively slow during initial installation of the assembly 1. This is because installation of the assembly 1 will generally be concurrent with an oil change. Thus, the oil would not yet have been subject, as a result of engine operation, to undesirable compositional change. In general, the cartridge 7 is preferably configured to only allow a relatively slow amount of treatment agent release primarily through static diffusion process, during the initial operation of the equipment under these conditions, at least up to about the first 200 hours of operation (more preferably at least the first 250 hours of operation, sometimes up to the first 300 hours of operation), for a typical diesel engine in a vehicle such as a truck. Preferably the apertures are positioned such that a dynamic flow operation will become substantial at the latest by about 350 hours of operation and in some instances as early as 250–300 hours operation, leading to an accelerated rate of treatment agent release into the system.

By the above, it is meant that preferably there is little dynamic flow operation if any, prior to at least 200 hours of operation with the assembly, but there is substantial dynamic flow operation by at the latest 350 hours of operation. The particular mode of operation in between these two limits, is a matter of choice and design. Typically the arrangement will be configured for primarily static flow operation at least up until about 250 hours of operation and in some instances up to about 300 hours of operation.

For the particular arrangement 1 depicted in FIGS. 1–6, the following dimensions were utilized for the example unit:

1. Outside diameter of housing 5, 118 mm;
2. Axial length of housing, 260 mm;
3. Axial length of cartridge 6, 161 mm;
4. Axial length of treatment agent storage and release cartridge between end cap 34 and end wall 56, 60.5 mm;
5. Larger outside diameter of wall 55 of cartridge 7, not including ribs 70, at end 55a, 11.5 mm;

6. Smaller outside diameter of wall 55 at end 55b, 109.1 mm;
7. Inside diameter of end 56, 51 mm;
8. Inside diameter of end 58, 44.8 mm.
9. Size of apertures in aperture arrangement 69, 5.0 mm in diameter; and,
10. The size of apertures in aperture arrangement 65, 5.0 mm in diameter.

Typically and preferably the apertures in aperture arrangement 69 will not be smaller than 1 mm in diameter, and typically they will be at least 3 mm in diameter, most preferably at least 5 mm in diameter. Further they will typically and preferably have a total diffusion area size of at least 40 sq. mm. or larger. Preferred sizes are provided below.

Whether the apertures in aperture arrangement 69 are circular or not, preferably each is at least 1 sq. mm in size, more preferably at least 8 sq. mm in size, most preferably at least 15 sq. mm in size. Most preferably there are at least two apertures in aperture arrangement 69.

With respect to the apertures in aperture arrangement 65, if round preferably each aperture is at least 1 mm in diameter, more preferably at least 3 mm in diameter, most preferably 5 mm or more. Preferably the area of each, whether round or otherwise, is at least 1 sq. mm, more preferably at least 8 sq. mm, most preferably at least 15 sq. mm. Preferred sizes, numbers and patterns are provided herein.

Preferably apertures 65a of aperture arrangement 65a are located spaced from end 55b and end wall 56 a distance within 25% of an axial length of treatment agent storage and release cartridge 7 (i.e., approximately a length of wall 55). Preferably apertures 65b of aperture arrangement 65 are located within 20% of this distance from end 55b (or end wall 56).

Preferably apertures 65d of aperture arrangement 65c are located at least 60% of an axial length of cartridge 7 (i.e., a length of side wall 55), from end wall 56, most preferably at least 70% of this length.

Preferably the aperture arrangement 69 has a total cross-sectional area of at least 55 sq. mm, typically 55 sq. mm–120 sq. mm. Preferably the total diffusion area of aperture arrangement 65a is at least 50% greater than this, most preferably at least about 100% greater than this. Similarly, preferably a total diffusion area of aperture arrangement 65c is at least 50% greater than the total aperture area of aperture arrangement 69, most preferably at least about 100% greater. Preferably the total aperture area or diffusion area of apertures in side wall 55 is at least 50% greater than, often at least 100% greater than, and typically 100%–200% greater than, a total diffusion area apertures and end wall 56.

The remaining dimensions would be as appropriate, to provide the arrangement of FIG. 1.

The dimensions, and relative dimensions, of course, can be changed. The particular dimensions chosen, were for utilization of the arrangement with a 600 hp diesel engine in a class 8 truck, to accomplish substantially only static flow operation up to at least about 300 hours of operation and with substantial dynamic flow operation starting by 350 hours of operation at the latest.

B. The Embodiment of FIGS. 7 and 8.

Figure 7:
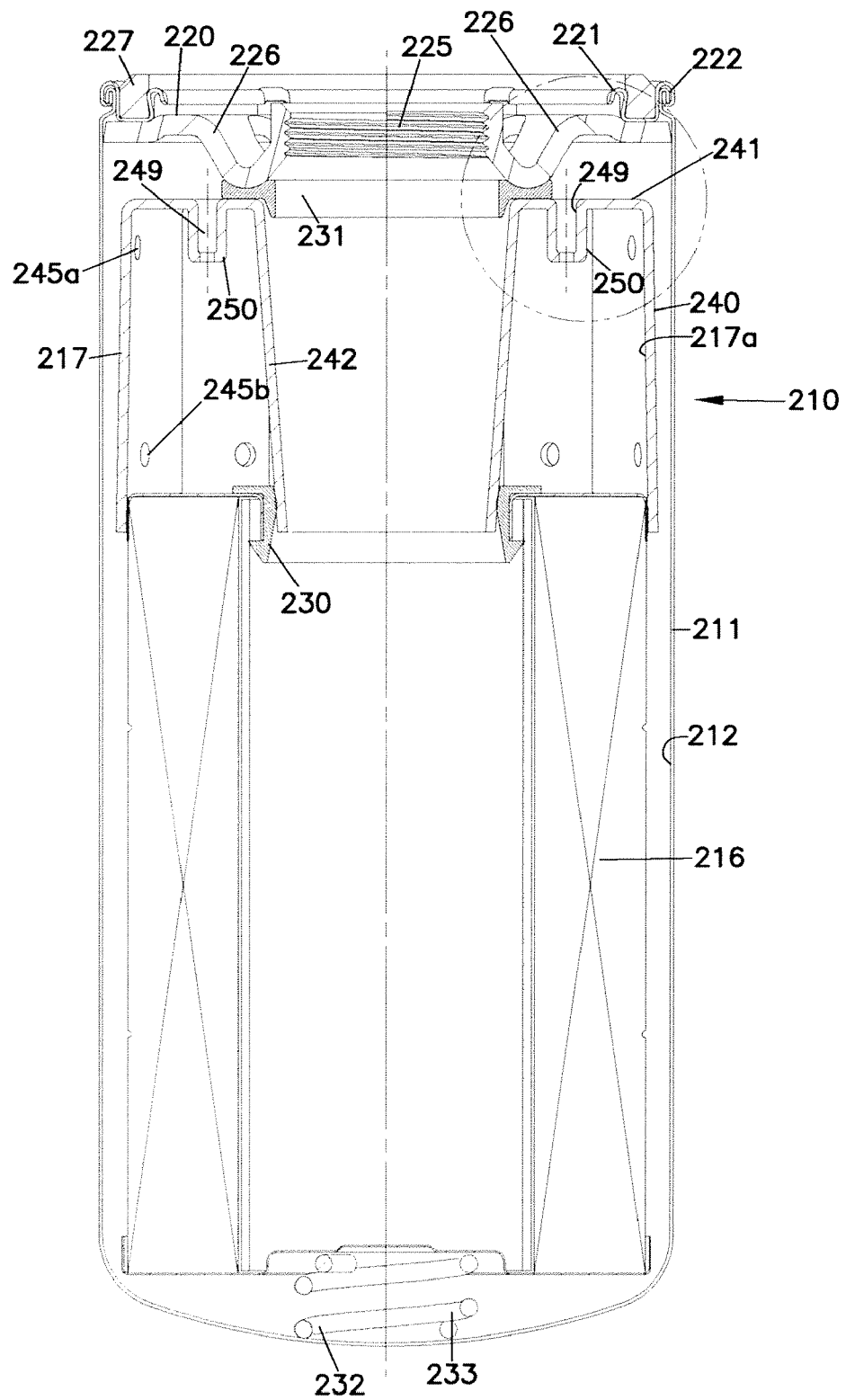
FIG. 7 is a cross-sectional view of a first alternate embodiment.
Figure 8:
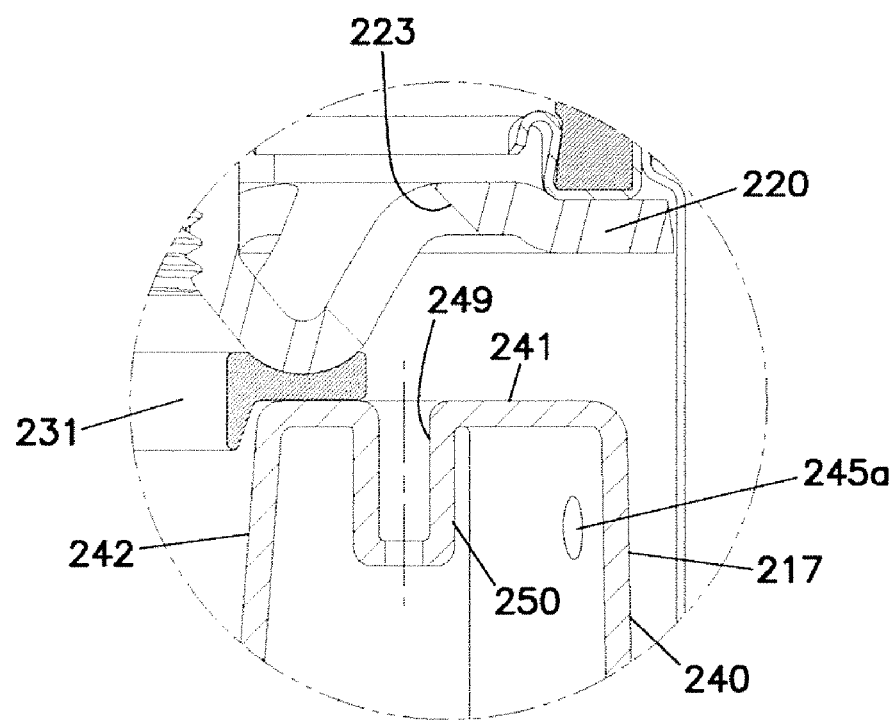
FIG. 8 is a fragmentary, enlarged, view of a portion of FIG. 7.

Attention is now directed to the embodiment of FIGS. 7 and 8, which is an alternate configuration for the treatment agent storage and release cartridge used. Referring to FIG. 7, assembly 210 is depicted having a housing 211 defining internal volume 212. Internally received are a filter cartridge 216 and a treatment agent and release cartridge 217. In general the cartridge 216 may be analogous to cartridge 6, FIGS. 1–6. Assembly 210 further includes a top plate 220 secured in place by a cover 221 attached to housing 211 at roll seam 222. The top plate 220 includes a threaded aperture 225 and inlet flow apertures 226. The assembly 210 further includes gasket 227 positioned on cover 221.

Internal gasket 230 is positioned between filter cartridge 216 and treatment agent storage and release cartridge 217. Gasket 231 provides for sealing between treatment agent storage and release cartridge 217 and top plate 220. Biasing to preserve seal is provided by biasing mechanism 232 (in this instance spring 233).

In general, analogously positioned and shaped parts in FIG. 7, to those in FIG. 1, perform analogous functions. The focus of attention here is on a modification in the internal configuration of the treatment agent storage and release cartridge 217.

Referring to FIG. 7, the treatment agent storage and release cartridge 217 includes outer side wall 240, end wall 241 and inner side wall 242. In outer side wall 240, cartridge 217 includes aperture arrangements 245a and 245b analogously to aperture arrangements 65a and 65c, FIG. 1.

In end wall 241 aperture arrangement 249 is positioned, analogous to aperture arrangement 69, FIG. 1. However, around some, and typically around each, aperture in aperture arrangement 249 an inlet stem 250 is provided, which causes liquid flow into the interior 217a of cartridge 217, from an associated aperture, to extend to a location 251 at the same axial (or vertical) height as aperture arrangement 245a, or below it, before the liquid from aperture 249 can flow toward aperture 245a. This would help ensure a liquid flow path into a center portion of treatment agent stored within volume 217a, before the liquid can exit through apertures 245a. This can cause a desirable affect on treatment agent diffusion, during operation. More particularly, the inlet stem 250, as it is lengthened, slows the rate of diffusion of the additive (in a static operation) therethrough. This will slow the rate at which dynamic flow operation is initiated. Modifying the length of diameter of the inlet stem 250 provides for control over the time the filter is in static flow condition versus dynamic flow condition.

In FIG. 8, a region of the assembly shown in FIG. 7, in the vicinity of stem 250, is shown enlarged, for convenient viewing.

III. General Observations

It is noted that for the particular arrangement shown in FIGS. 1–8, as depicted in FIGS. 1 and 7 specifically, the treatment agent storage and release cartridge (7, 217) in each case is positioned above an associated filter cartridge (6, 216). Although alternatives are possible, this is a preferred orientation if, when installed, the assemblies (1, 210) are mounted in the orientation shown. That is, it is generally preferred that a treatment agent be held above the filter cartridge, so that gravity helps move the treatment agent, which is generally more dense than the liquid. If the assembly 1 is configured to be installed inverted relative to the orientation of FIGS. 1 and 7, an inverted orientation of the filter cartridge storage and release arrangement, relative to the filter cartridge, can be used if desired.

In general terms, a liquid filter arrangement is provided which includes a housing, an internally received filter cartridge and an internally received treatment agent storage and release cartridge. The preferred treatment agent storage and release cartridge is configured to have a diffusion aperture arrangement providing for a first static diffusion operation and a second dynamic flow diffusion operation. For the particular embodiment provided, this is done by having a treatment agent storage and release cartridge include an end wall with a first aperture arrangement in it, and a sidewall with a second aperture arrangement in it. The aperture arrangement in the end wall preferably has a smaller total diffusion area, than the aperture arrangement in the side wall. A particular example is provided in which, in the end wall, a plurality of spaced apertures, preferably at least 3 and typically 4–7 are provided in a ring circular pattern. Further, for the preferred arrangements shown, the second aperture arrangement in the side wall, comprises two sets of apertures spaced axially, each set having a larger total diffusion area than the set of diffusion apertures in the end wall.

A particular arrangement is shown in which, positioned between the treatment agent storage and release cartridge, and an inlet for the filter assembly, an inlet volume is provided with a first cross-sectional area; and, around the outside of the treatment agent storage and release cartridge, and the filter cartridge, an annulus is provided with the second cross-sectional area; typically the first cross-sectional area being larger than the second, so that flow across aperture arrangement 65 will be faster than flow across aperture arrangement 69.

In example arrangements provided and described thus far, the treatment agent storage and release cartridge includes a ring construction with an outer side wall, an inner side wall and an end wall between the outer and inner side walls.

The arrangement can be configured as a spin-on housing, or the internal components can be assembled as bowl/cartridge arrangement.

A typical, useable total diffusion area for the apertures in the end wall of the treatment agent storage and release cartridge, for use with a lubricating oil arrangement, will be at least to 55 sq. mm, typically 55 to 120 sq. mm. A typical total diffusion area for an aperture arrangement in the outer side wall, will be at least 50% larger (typically at least 100% larger), than the total diffusion area of the aperture arrangement in the end wall. Thus, typically the side wall total diffusion area is at least 82 sq. mm, typically at least 110 sq. mm and often much higher. Preferably if two rows of diffusion apertures are used in the outer sidewall, each row has a total diffusion area of at least 82 sq. mm, typically at least 110 sq. mm and often much higher.

In general, the preferred internally received treatment agent storage and release cartridge may be characterized as having a diffusion arrangement providing for: initial static diffusion operation; and, later a dynamic flow diffusion operation. It is noted that some advantage could be provided by providing the cartridge 7 such that there is at all times a dynamic flow operation therethrough. For the arrangement of FIG. 1, this could be facilitated by having the treatment agent 62, initially, not cover apertures 65b.

IV. A Second Alternate Embodiment

In FIGS. 9–12, a third embodiment (second alternate) of a filter assembly is depicted.

Figure 9:
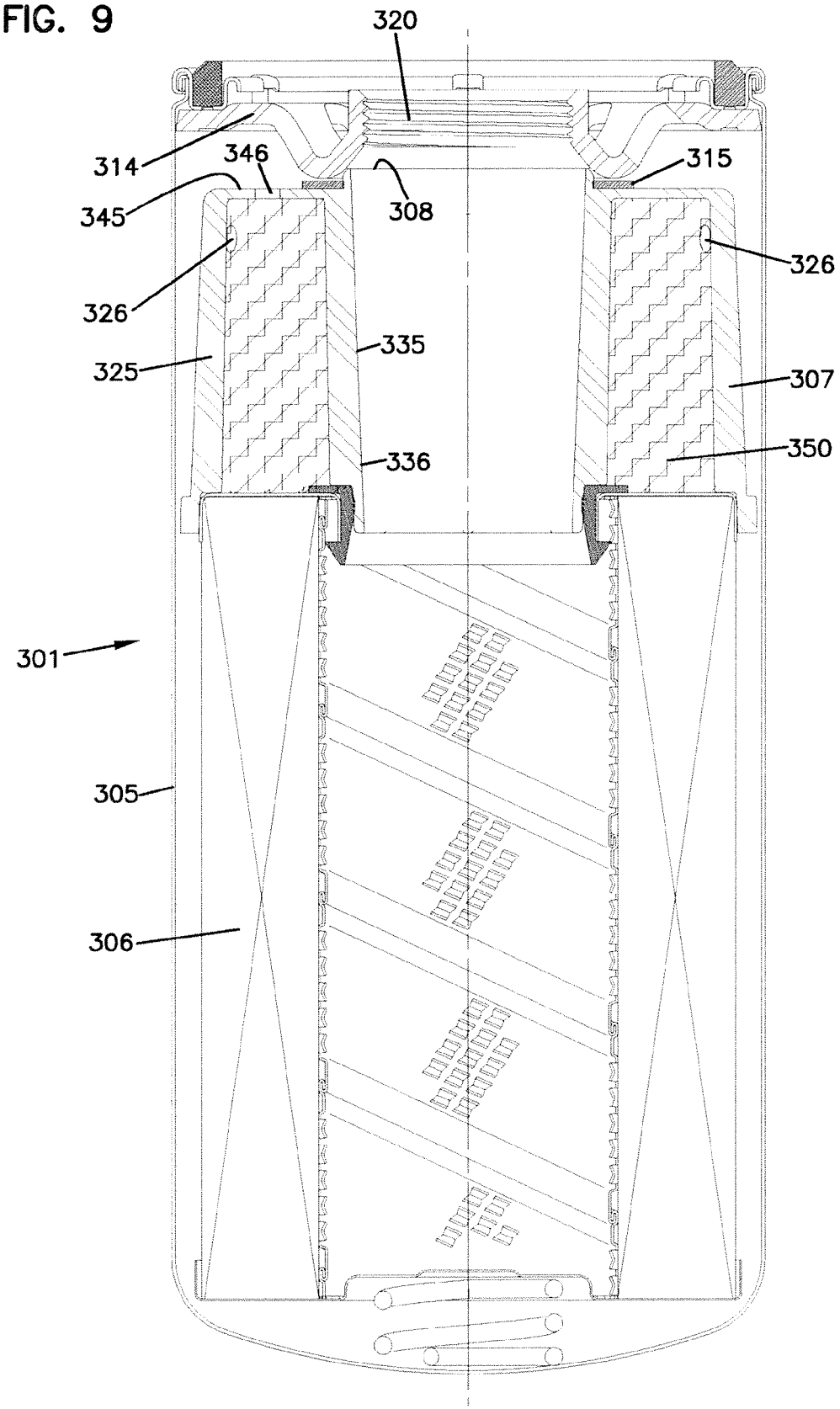
FIG. 9 is a schematic cross-sectional view analogous to FIG. 1, showing a second alternate embodiment of a filter assembly.

Referring first to FIG. 9, the reference numeral 301 depicts the filter assembly, according to this third embodiment, in cross-sectional view. The filter assembly 301 is generally analogous to filter assembly 1, FIG. 1, with modification as described specifically in this section. Thus assembly 301 generally comprises an outer housing or can 305, filter cartridge 306 and a treatment agent storage and release cartridge 307. The housing 305 and filter cartridge 306 may generally be analogous to housing or can 5 and cartridge 6, FIG. 1.

The treatment agent storage and release cartridge 307 may also be generally analogous, except modified as follows. In particular, cartridge 307 includes projection 308 extending toward top plate 314. Gasket 315 is positioned surrounding projection 308 and provides a seal between top plate 314 and treatment agent storage and release cartridge 307.

The basic difference between assembly 301 and assembly 1, relates to the nature of gasket 315, and its position, as well as projection 308. The assembly 1, FIG. 1, does not contain a projection analogous to projection 308, and as a result, gasket 15, FIG. 1, included a portion which defined a flow aperture for exit a filtered liquid from the assembly 1. In the instance of FIG. 9, i.e., assembly 301, projection 308 defines a flow exit for filtered liquid flow to exit aperture 320 in top plate 314. The gasket 315 surrounds the projection 308 and forms the requisite seal.

Figure 10:
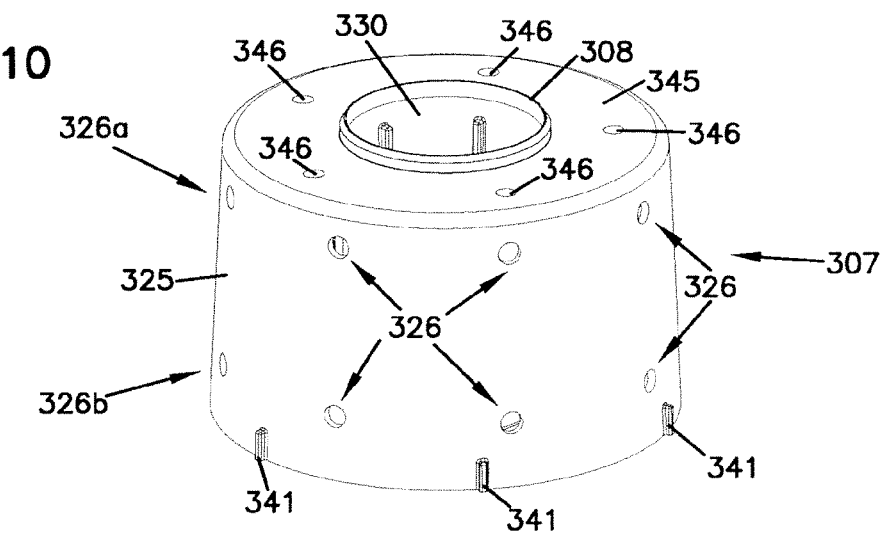
FIG. 10 is a top perspective view of a treatment agent storage and release cartridge useable in the embodiment of FIG. 9.
Figure 11:
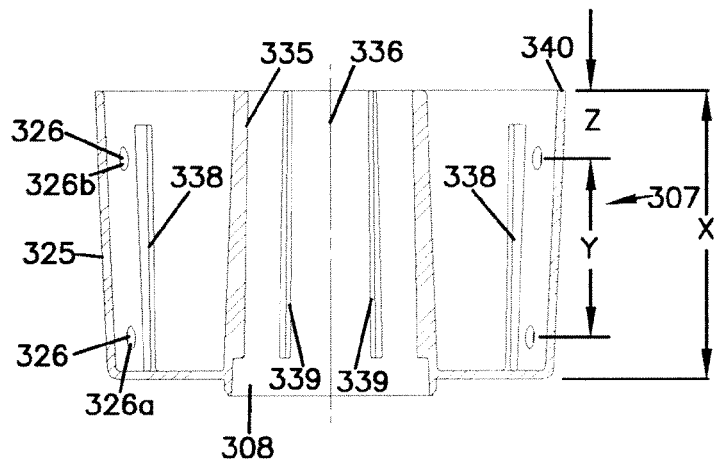
FIG. 11 is an inverted cross-sectional view of the cup depicted in FIG. 10, the cross-sectional view taken along line 11—11, FIG. 12.
Figure 12:
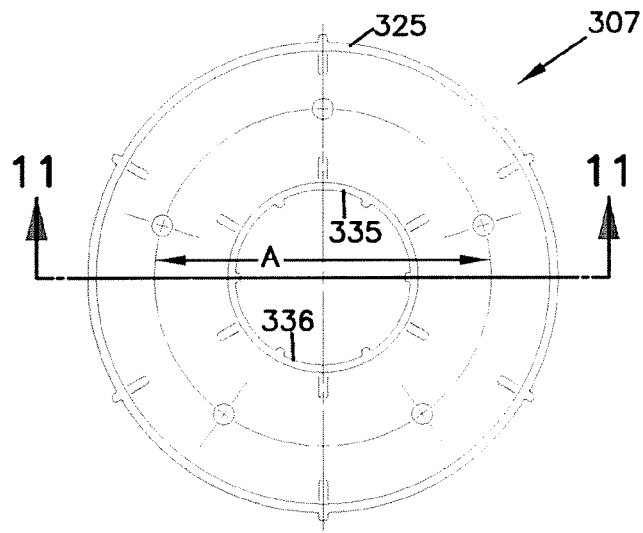
FIG. 12 is a bottom plan view of the cup depicted in FIG. 10.

In FIGS. 10–12, the treatment agent storage and release cartridge 307 is depicted in greater detail. Referring to FIG. 10, the cartridge 307 includes an outer surface or sidewall 325 with an aperture arrangement comprising apertures 326, in two rows 326a, 326b therein. Further a central flow aperture 330 is defined, in part, by projection 308.

Referring to FIG. 11, the cartridge 307 includes an inner side wall 335, surrounding and defining central flow region 336.

An interior of wall 325 includes reinforcing ribs 338. An inside surface of wall 335, defining passage way 336, includes reinforcing ribs 339.

Referring to FIG. 10, edge 340 of cartridge 307, which is sized and positioned to extend around the filter cartridge 306, FIG. 9, in use, includes projections 341, which operate as spacers at this location.

Referring to FIG. 11, it is noted that ribs 338 are recessed from edge 340, to provide for preferred engagement with the filter cartridge 306.

Although alternatives are possible, for an example arrangement, the dimension indicated at X is about 68.5 mm (2.7 inches), the dimension indicated at Y is about 42.5 mm (1.67 inches) and the dimension indicated at Z is about 16 mm (0.63 inches). Sidewall 325, as shown, has a slight conical shape with a widest end at edge 340.

The wall 325 includes sixteen (16) apertures 326 (two rows of eight (8)) therein, each having a diameter of 5.56 mm (about 0.219 inches), although alternatives are possible.

Referring to FIG. 10, opposite edge 340, cup or cartridge 307 includes end face or end wall 345 having apertures 346 therein. The face 345 is shown having five equally spaced apertures 346, for the example shown each having a diameter each of 5.0 mm (0.20 inches), although alternatives are possible.

Referring to FIG. 12, for the example shown dimension A would be about 80 mm (3.15 inches), although alternatives are possible.

The example shown is particularly useful for forming assembly 307 for certain liquid filter applications. Relative dimensions for the filter cartridge can be determined from FIG. 9, based on the scale shown, and the dimensions described with respect to FIGS. 9–12.

It is noted that a variety of alternate dimensions can be used for other systems.

In FIG. 9, treatment agent is shown at 350.

Of course the arrangement of FIGS. 9–12 could be modified to include the stem arrangement 250 of FIGS. 7 and 8.

What is claimed is:

1. A liquid filter arrangement comprising:
   (a) a housing;
   (b) an internally received filter cartridge; and
   (c) an internally received treatment agent storage and release cartridge; the treatment agent storage and release cartridge having a diffusion aperture arrangement providing for:
      (i) an initial static flow diffusion operation; and,
      (ii) a later dynamic flow diffusion operation;
      (iii) the internally received treatment agent storage and release cartridge being configured only for release of treatment agent into unfiltered liquid within the housing, during use, at a location upstream of the internally received filter cartridge, and the treatment agent storage and release cartridge having an outer side wall, an inner side wall and an end wall between the outer and inner side walls;
         (A) the end wall having a flow aperture arrangement therethrough;
         (B) the outer side wall having a flow aperture arrangement therethrough;
         (C) the inner side wall defining a flow channel and having no diffusion apertures therethrough; and,
         (D) a total diffusion area of the flow aperture arrangement in the side wall being at least 50% greater than a total diffusion area of the flow aperture arrangement in the end wall, wherein
   the housing, the internally received filter cartridge and the internally received treatment agent storage and release cartridge are configured to define an inlet flow path, for liquid to be filtered, at a location across an end wall of the treatment agent storage and release cartridge and then across a side wall of the treatment agent storage and release cartridge and the filter cartridge.

2. A liquid filter arrangement according to claim 1 including:
   (a) a top plate with an annular flow inlet arrangement; and a central flow exit; and,
   (b) a first gasket arrangement positioned adjacent the top plate at a location between the annular flow inlet arrangement and the central flow outlet;
   (c) the treatment agent storage and release cartridge being oriented with the end wall adjacent the gasket arrangement; and
   (d) the treatment agent storage and release arrangement positioned being between the top plate and the filter cartridge.

3. A liquid filter arrangement according to claim 1 wherein:
   (a) the housing is configured as a spin on filter housing.

4. A liquid filter arrangement according to claim 1 wherein:
   (a) the end wall of the storage and release cartridge includes a set of flow apertures therein with a total diffusion area of at least 55 sq. mm; and,
   (b) the outer side wall of the storage and release cartridge includes a first set of apertures therein;
      (i) each aperture in the first set of apertures being positioned within a distance of 25% of an axial length of the storage and release cartridge from the end wall;
      (ii) the first set of apertures in the outer side wall having a total diffusion area of at least 82 sq. mm; and a total diffusion area at least 50% larger than the total diffusion area of the set of flow apertures in the end wall.

5. A liquid filter arrangement according to claim 4 wherein:
   (a) the outer side wall of the storage and release cartridge includes a second set of apertures therein;
      (i) each aperture of the second set of apertures being positioned a distance of at least 60% of a total axial length of the storage and release cartridge from the end wall.

6. An arrangement according to claim 1 wherein:
   (a) the filter cartridge comprises pleated media.

7. A cartridge assembly adapted to be contained in a housing, the assembly comprising:
   (a) a filter media construction, having first and second ends, positioned around a central open area; and,
   (b) a treatment agent storage and release cartridge positioned adjacent an end of the media construction; the treatment agent storage and release cartridge having a diffusion aperture arrangement providing for:
      (i) an initial static flow diffusion operation;
      (ii) a later dynamic flow diffusion operation; and
      (iii) the internally received treatment agent storage and release cartridge being configured only for release of treatment agent into unfiltered liquid within the housing, during use, at a location upstream of the internally received filter cartridge; and
      (iv) the treatment agent storage and release cartridge having an outer sidewall, an inner side wall and an end wall between the outer and inner side walls;
         (A) the end wall having a flow aperture arrangement therethrough;
         (B) the outer side wall having a flow aperture arrangement therethrough;
         (C) the inner side wall defining a flow channel and having no diffusion apertures therethrough; and,
         (D) a total diffusion area of the flow aperture arrangement in the side wall being at least 50% greater than a total diffusion area of the flow aperture arrangement in the end wall.

8. A cartridge assembly according to claim 7 wherein:
   (a) the end wall of the storage and release cartridge includes a set of flow apertures therein with a total diffusion area of at least 55 sq. mm; and,
   (b) the outer side wall of the storage and release cartridge includes a first set of apertures therein;
      (i) each aperture in the first set of apertures being positioned within a distance of 25% of an axial length of the storage and release cartridge from the end wall;
      (ii) apertures in the outer side wall having a total diffusion area of at least 82 sq. mm; and a total diffusion area at least 50% larger than the total diffusion area of the set of flow apertures in the end wall.

9. A cartridge assembly according to claim 8 wherein:
   (a) the outer side wall of the storage and release cartridge includes a second set of apertures therein;
      (i) each aperture of the second set of apertures being positioned a distance of at least 60% of a total axial length of the storage and release cartridge from the end wall.

10. A cartridge assembly according to claim 9 wherein:
    (a) the filter media construction and the storage and release cartridge are separable from one another.

11. A cartridge assembly according to claim 7 wherein:
    (a) the filter media construction comprises pleated media.

12. A cartridge assembly adapted to be contained in a housing, the assembly comprising:

(a) a filter media construction, having first and second ends, positioned around a central open area; and,
(b) a treatment agent storage and release cartridge positioned adjacent an end of the media construction; the treatment agent storage and release cartridge having a diffusion aperture arrangement providing only for release of treatment agent into unfiltered liquid within the housing, during use, at a location upstream of the internally received filter cartridge;
(c) the treatment agent storage and release cartridge having an outer sidewall, an inner side wall and an end wall between the outer and inner side walls;
  (i) the end wall having a flow aperture arrangement therethrough;
  (ii) the outer side wall having a flow aperture arrangement therethrough;
  (iii) the inner side wall defining a flow channel and having no diffusion apertures therethrough; and,
  (iv) a total diffusion area of the flow aperture arrangement in the side wall being at least 50% greater than a total diffusion area of the flow aperture arrangement in the end wall.

13. A cartridge assembly according to claim 12 wherein:
(a) the end wall of the storage and release cartridge includes a set of flow apertures therein with a total diffusion area of at least 55 sq. mm; and,
(b) the outer side wall of the storage and release cartridge includes a first set of apertures therein;
(i) each aperture in the first set of apertures being positioned within a distance of 25% of an axial length of the storage and release cartridge from the end wall;
(ii) apertures in the outer side wall having a total diffusion area of at least 82 sq. mm; and a total diffusion area at least 50% larger than the total diffusion area of the set of flow apertures in the end wall.

14. A cartridge assembly according to claim 13 wherein:
(a) the outer side wall of the storage and release cartridge includes a second set of apertures therein;
(i) each aperture of the second set of apertures being positioned a distance of at least 60% of a total axial length of the storage and release cartridge from the end wall.

15. A cartridge assembly according to claim 14 wherein:
(a) the filter media construction and the storage and release cartridge are separable from one another.

16. A cartridge assembly according to claim 12 wherein:
(a) the filter media construction comprises pleated media.

17. A liquid filter arrangement comprising:
(a) a housing;
(b) an internally received filter cartridge; and
(c) an internally received treatment agent storage and release cartridge; the treatment agent storage and release cartridge having a diffusion aperture arrangement providing only for release of treatment agent into unfiltered liquid within the housing, during use, at a location upstream of the internally received filter cartridge, and the treatment agent storage and release cartridge having an outer side wall, an inner side wall and an end wall between the outer and inner side walls;
  (i) the end wall having a flow aperture arrangement therethrough;
  (ii) the outer side wall having a flow aperture arrangement therethrough;
  (iii) the inner side wall defining a flow channel and having no diffusion apertures therethrough; and,
  (iv) a total diffusion area of the flow aperture arrangement in the side wall being at least 50% greater than a total diffusion area of the flow aperture arrangement in the end wall.

18. An arrangement according to claim 17 wherein:
(a) the filter cartridge comprises pleated media.

19. A liquid filter arrangement according to claim 17 wherein:
(a) the housing is configured as a spin on filter housing.

* * * * *